No. 833,552. PATENTED OCT. 16, 1906.
W. H. SAUNDERS.
POWER TRANSMITTING MECHANISM.
APPLICATION FILED JAN. 10, 1906.

4 SHEETS—SHEET 1.

WITNESSES:
E. Thorpe.
A. E. Fay.

INVENTOR
William H. Saunders
BY
Munn & Co.
ATTORNEYS

No. 833,552. PATENTED OCT. 16, 1906.
W. H. SAUNDERS.
POWER TRANSMITTING MECHANISM.
APPLICATION FILED JAN. 10, 1906.

4 SHEETS—SHEET 3.

WITNESSES:
Edward Thorpe

INVENTOR
William H. Saunders
BY
Munn & Co
ATTORNEYS

No. 833,552. PATENTED OCT. 16, 1906.
W. H. SAUNDERS.
POWER TRANSMITTING MECHANISM.
APPLICATION FILED JAN. 10, 1906.

4 SHEETS—SHEET 4.

WITNESSES:
Edward Thorpe
O. E. Fay

INVENTOR
William H. Saunders
BY
Munn & Co.
ATTORNEYS

UNITED STATES PATENT OFFICE.

WILLIAM H. SAUNDERS, OF PHILADELPHIA, PENNSYLVANIA.

POWER-TRANSMITTING MECHANISM.

No. 833,552.  Specification of Letters Patent.  Patented Oct. 16, 1906.

Application filed January 10, 1906. Serial No. 295,395.

*To all whom it may concern:*

Be it known that I, WILLIAM HENRY SAUNDERS, a citizen of the United States, and a resident of Philadelphia, in the county of Philadelphia and State of Pennsylvania, have invented a new and Improved Power-Transmitting Mechanism, of which the following is a full, clear, and exact description.

My invention relates to a power-transmitting mechanism, the principal objects thereof being to provide a belt-driven antifriction variable-speed counter-shaft drive which will have many advantages over those which have heretofore been invented.

Devices which have heretofore been proposed for this purpose have usually been of such a nature that three or more belts had to be employed, and it is well understood that this is a disadvantage, as it takes a greater width of belt to furnish the same power than would be the case if a single belt were employed, and there is the danger of one belt climbing upon another and causing great damage. Moreover, the idler-frame which is usually employed ordinarily has pulleys crowned in the opposite way from which the driving-pulleys are crowned, thus injuring the belts. The roller or ball bearings which are employed on these devices in order to reduce friction sometimes burn out at the high speeds at which they are operated. Also the breaking of the belt almost necessarily results in damage.

The principal objects of my invention are to overcome all these disadvantages, to construct a device of this character in a very simple manner and without great cost, to greatly reduce friction, and to provide means for slackening or tightening the belt without stopping the machinery.

Further objects of the invention will appear below.

Reference is to be had to the accompanying drawings, forming a part of this specification, in which similar characters of reference indicate corresponding parts in all the figures.

Figure 1:
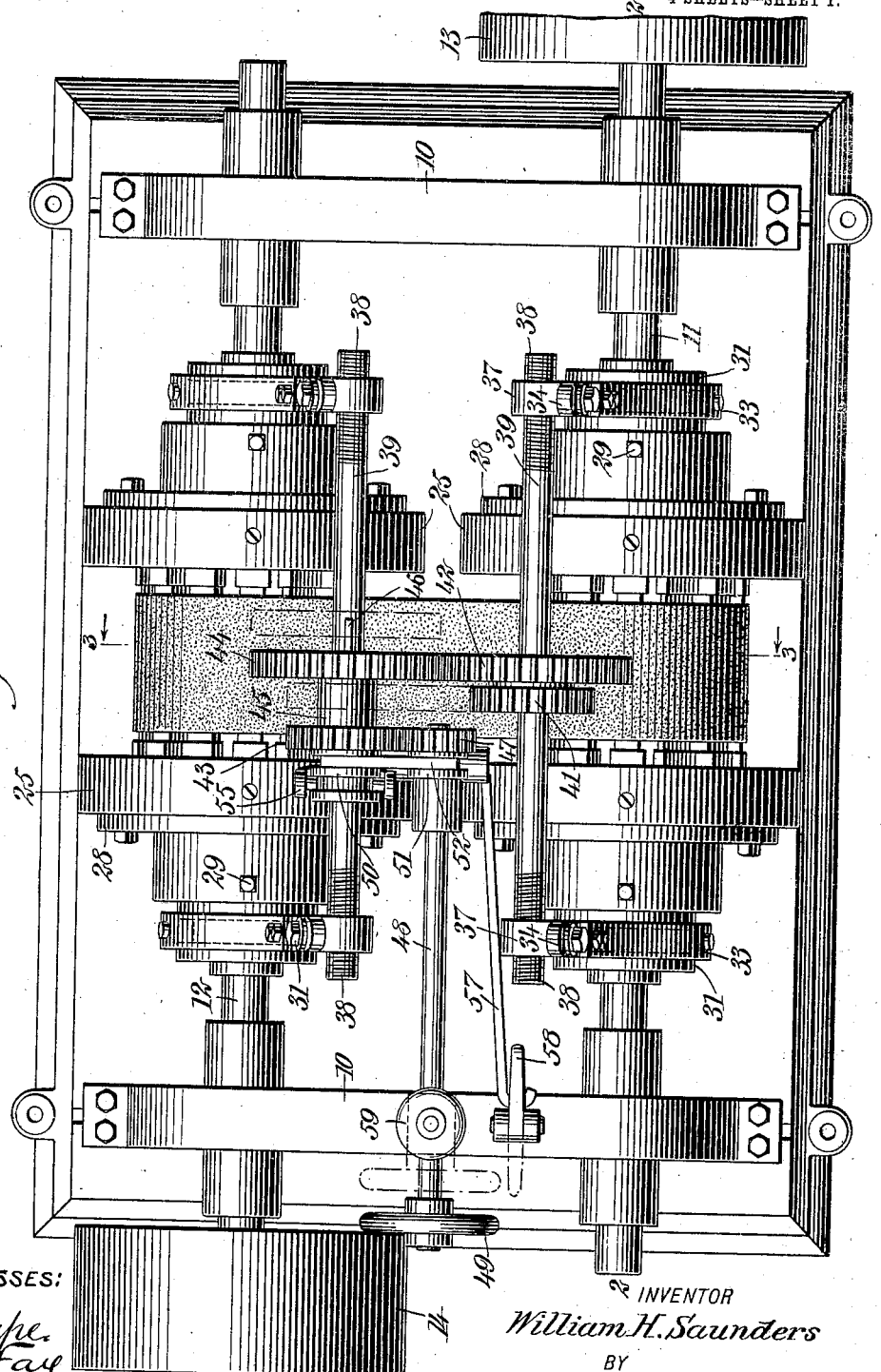
Figure 2:
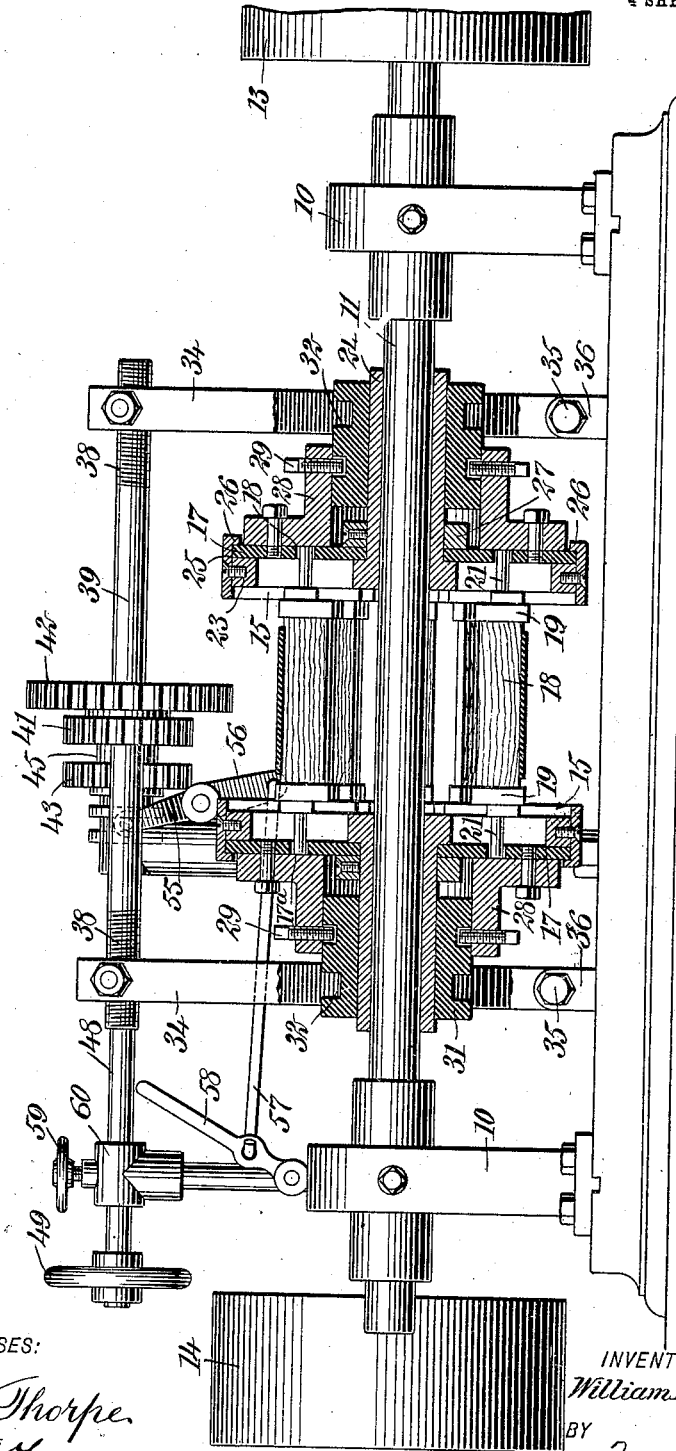
Figure 3:
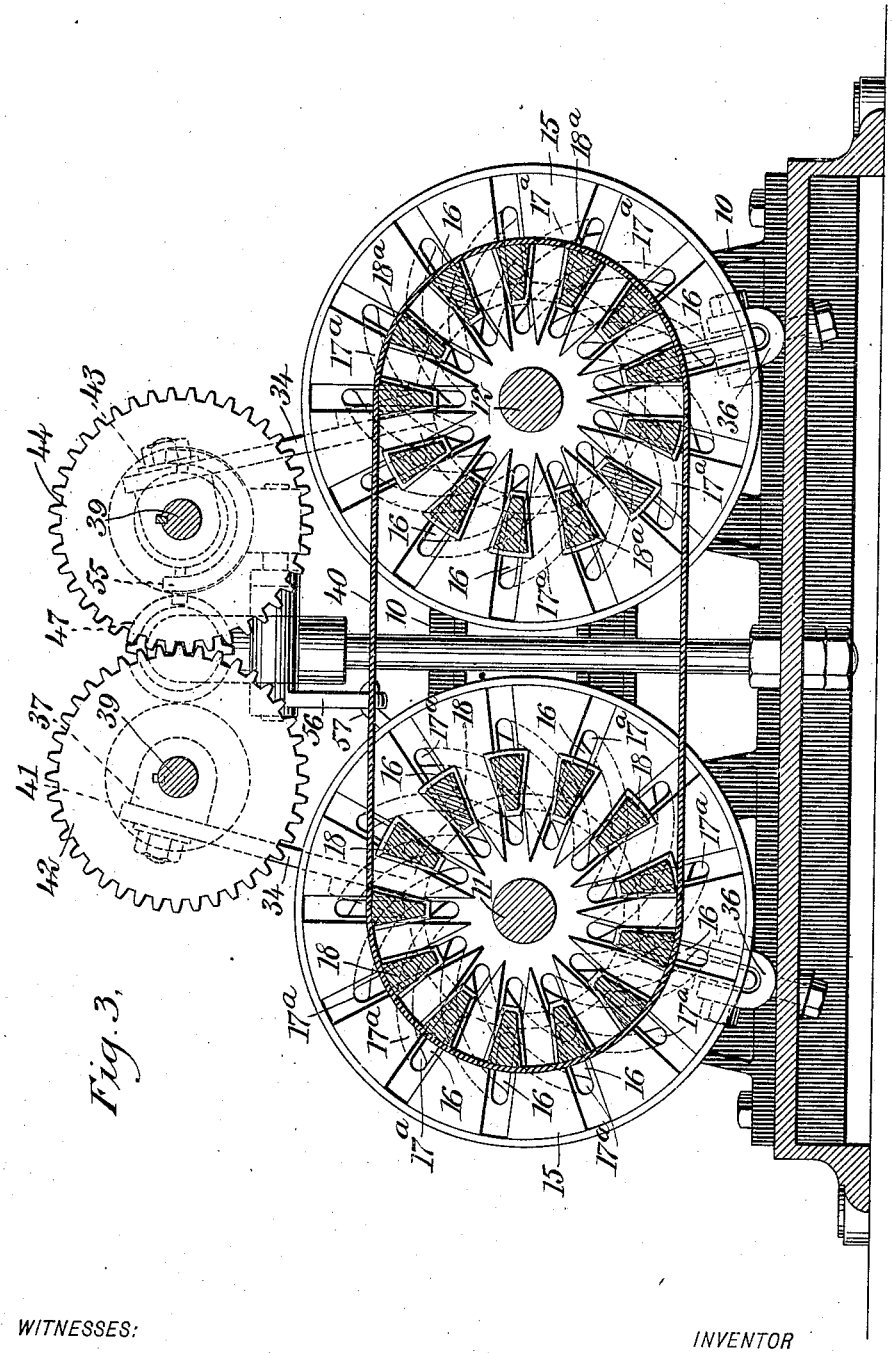
Figure 5:
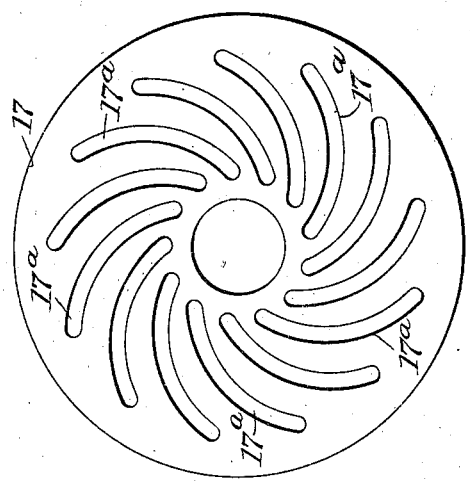
Figure 8:
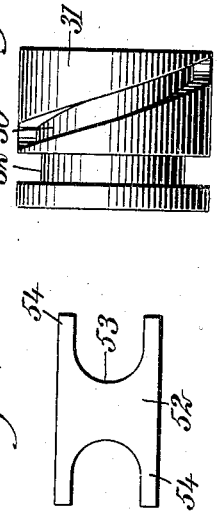
Figure 7:
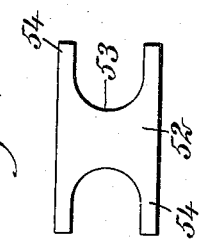
Figure 4:
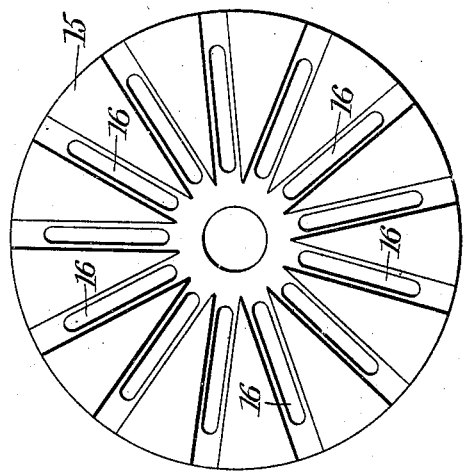
Figure 6:
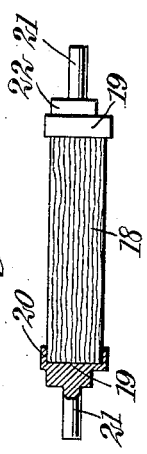

Figure 1 is a plan of a device constructed in accordance with the principle of my invention. Fig. 2 is a sectional view on the line 2 2 of Fig. 1. Fig. 3 is a sectional view on the line 3 3 of Fig. 1. Figs. 4 and 5 are face views of a pair of regulating-disks employed in my invention. Fig. 6 is a view of one of the sticks or sections of one of the pulleys which are employed. Fig. 7 is an elevation of a detail, and Fig. 8 is an elevation of a worm constituting part of the invention.

I have shown the device as mounted upon a frame 10, which is provided with bearings for supporting a power-receiving member or shaft 11 and a power-transmitting member or shaft 12. The power is preferably received by this device from tight and loose pulleys 13 and transmitted from it through a pulley 14, the former being mounted on the shaft 11 and the latter on shaft 12. Aside from the pulleys these two shafts are constructed in substantially the same way and are provided with the same attachments. These attachments will be described with special reference to the shaft 11, reference being had to Fig. 2. Located opposite and facing each other on the shaft are mounted a pair of disks 15. These disks are provided with a number of straight radial slots 16. At the rear of these disks are located a second pair of disks 17, provided with curved slots 17ª. The curved slots are preferably the same in number as the straight slots, and the purpose of these two pairs of disks is to support a series of blocks or cross-pieces 18 between them in a circular series, so as to constitute a pulley. These blocks 18 are provided with steel end pieces 19, each having a socket 20 for the reception of the end of the block and each provided with a trunnion 21 extending therefrom, the two trunnions being in line with each other. The blocks are of such form and cross-section that their outer edges will serve to support a driving-belt, while they are capable of moving inwardly toward each other along the slots 16. In order to best provide for this action, I have shown these blocks as of a wedge shape. The trunnions 21 are designed to extend through the slots 16 and enter the slots 17ª, while a rectangular projection 22 on each of the end pieces 19 slides out and in in each of the slots 16.

From the description so far given it will be obvious that the oscillation of the disk 17 with respect to the disk 15 will result in moving the trunnions 21 either outwardly or inwardly, according to the direction of motion of the disks, and that accordingly the adjustment of the cross-pieces 18, so as to increase or decrease the diameter of the pulley formed by them, is a simple matter of oscillating one of the disks with respect to the other. For the purpose of accomplishing this result the disk 15 is mounted on a plate 23, which has a hub 24 keyed to the shaft. A wrought-iron band 25 is secured to the plate 23 with an inwardly-extending flange 26, which forms a bearing for the disk 17. This disk is mounted to oscillate on the hub 24, and in order to secure this oscillation it is provided with a collar 27 to hold it against the plate 23 and is connected with a hub 28. This hub is provided with a series of studs 29, projecting into one or more worm-grooves 30 on a worm 31. This worm is reciprocatingly mounted on the hub 24, and it will be obvious that its reciprocation will cause the studs 29 to oscillate in the grooves 30, which will in turn cause the oscillation of the disk 17 and the adjustment of the cross-pieces 18. It will be understood that these parts are duplicated on both sides of the cross-pieces, as is clearly indicated in Fig. 2. The two worms 31 are provided with grooves 32, in which engage collars 33, mounted on frames 34, that are pivoted, by means of bolts or studs 35, to brackets 36, located in a stationary position on the frame or base of the machine. It is obvious that in order to operate both sides of the cross-pieces 18 at the same rate of speed the two frames 34 should be moved at all times in opposite directions at the same rate. In order to provide for this, each frame has a nut 37 mounted upon it, this nut being provided with screw-threads for engaging screws 38 on a rod 39, one of the screws being left-handed and the other right-handed.

The parts described above are connected with the shaft 11; but the same features are applied to the shaft 12, and the same reference-numerals are applied to corresponding elements connected with the shaft 12 with the exception of the cross-pieces. Those that are connected with the shaft 11 have been designated 18, and for convenience those connected with the shaft 12 are designated 18$^a$. The two pulleys formed by the cross-pieces 18 and 18$^a$, respectively, are connected by a belt 40. It will be seen, therefore, that the change in the size of the pulley formed by the cross-pieces 18 will result in transmitting power from the shaft 11 to the shaft 12 at a different rate of speed. My invention therefore comprises the use of such a pulley as that described upon either one of the shafts 11 or 12; but in its preferred form it comprises both, and not only the adjustability of these pulleys, but the simultaneous adjustment of them in opposite directions—that is, the provision of means whereby the enlargement of one pulley and the reduction in size of the other will proceed simultaneously—thus resulting in a more rapid change in the rate of transmission of power. For the purpose of accomplishing this result the two rods 39 are each provided with gears, those on one rod being designated 41 and 42, and those on the other 43 and 44. The gears 43 and 44 are mounted on a sleeve 45, which is provided with a keyway engaging a key 46 on the rod 39, upon which these pulleys are mounted, the sleeve being reciprocable from the position shown in the full lines, Fig. 1, to that in the dotted lines. In the former position the gear 44 meshes with the gear 42, it being understood that the gears 41 and 42 are stationary on their rod 39. Therefore, any rotation of either of the rods 39 is transmitted to the other rod in the opposite direction, so that any motion of these rods tending to change the diameter of the two pulleys formed by the cross-pieces 18 and 18$^a$ will be of such a nature that one of the pulleys will be enlarged, while the other is reduced in diameter.

For the purpose of conveniently adjusting the pulleys through the instrumentality of the gears described above I have shown a gear 47, meshing with the gear 43 and mounted upon a reciprocable shaft 48. A hand-wheel 49 or other convenient means is employed for rotating the shaft 48 to accomplish this adjustment. It will be obvious that when the sleeve 45 is shifted along the rod upon which it is mounted it will be necessary to move the gear 47 with the gear 43, in order that the rotation of the shaft 48 be transmitted to the rods 39. For this purpose gears 43 and 47 are provided with collars 50 and 51. Between these collars is mounted a plate 52, (shown in Fig. 7,) this plate having depressions 53 in its opposite edges, and arms 54 to engage the collars 50 and 51. Any longitudinal motion of either of the gears 43 and 47 will therefore be transmitted to the other, and they therefore remain in mesh at all times. When the parts are in the position shown in dotted lines in Fig. 1, the gear 47 meshes with the gear 41, and consequently the gears 43 and 41 and the two rods 39 rotate in the same direction. This results in expanding or contracting both of the pulleys and, therefore, tightening or slackening the belt, as may be desired. For the purpose of moving the sleeve 45 longitudinally of the rod I have shown a fork 55 for engaging a collar 56 on the sleeve, this fork being mounted on a lever 56$^a$, which is connected by a link 57 with an operating-lever 58. In order to provide for holding the shaft 48 in any desired position, both with respect to angular and longitudinal motion, a hand-screw 59 in a bearing 60 for the shaft 48 is employed.

The operation of the device is exceedingly simple and has been sufficiently described above in connection with the several features. It will be observed that the transmission of the power is accomplished by the use of a single belt, which does away with the difficulties sometimes encountered when a plurality of belts running side by side is employed. It will also be seen that there is no idler-pulley to injure the belt, that no roller or ball bearings are necessary other than the main bearings of the two shafts, which can be made in the most efficient manner and which account for practically all the loss in friction which may occur in the whole device. If the belt breaks, the cross-pieces will not fall out or be forced out by centrifugal force, and thus all source of injury to the machine is avoided. The tightening or slackening of the belt while the machine is running and transmitting power is very simple and efficiently provided for. The disks for operating the cross-pieces are straight on the face, keyed to the shaft, and do not rotate with respect to the shaft except for the adjustment of one of them. Therefore, the tension on the trunnions of the bearings is done away with, this being a feature which causes much expense and trouble in other machines of this character.

The entire drive is exceedingly simple and has no parts which will readily get out of order in ordinary running at high speed or with rough usage.

The design of the device is of such a nature that its construction is not limited to any particular size or horse-power.

Having thus described my invention, I claim—

1. In a power-transmitting device the combination of a pair of shafts, a pair of expansible pulleys, one connected with each shaft, and means for expanding and contracting said pulleys, comprising a pair of rods, one connected with each pulley, two gears mounted in a stationary position on one of said rods, two gears keyed to the other rod and slidingly mounted thereon, one of the last-named gears being adapted to mesh with one of the other gears, and an additional gear movable with the sliding gears and meshing with one of them.

2. In a power-transmitting device the combination of a pair of shafts, means for varying the speed of transmission from one shaft to the other, a pair of rods, one connected with each shaft, two gears mounted on one of said rods, two gears rigidly connected together and slidingly mounted upon the other rod, an additional gear meshing with one of the last-named gears, and means for reciprocating the additional gear and the two sliding gears to bring one of the sliding gears into mesh with one of the gears on the other rod and to bring the additional gear into mesh with the other gear upon the said other rod.

3. In a power-transmitting device the combination of a pair of gears secured together, a second pair of gears slidingly mounted with respect to the first pair, one of the second pair adapted to mesh with one of the first pair, an additional gear meshing with the second gear of the second pair and adapted to mesh with the other gear of the first pair, and means for reciprocating the second pair of gears and the additional gear simultaneously.

4. In a power-transmitting device the combination of a pair of gears secured together, a second pair of gears slidingly mounted with respect to the first pair, one of the second pair adapted to mesh with one of the first pair, an additional gear meshing with the second gear of the second pair and adapted to mesh with the other gear of the first pair, means for reciprocating the second pair of gears and the additional gear simultaneously, and means for rotating the additional gear, said means comprising a shaft connected with said gear and a hand-wheel on the shaft.

5. In a power-transmitting device the combination of a pair of gears secured together, a second pair of gears slidingly mounted with respect to the first pair, one of the second pair adapted to mesh with one of the first pair, an additional gear meshing with the second gear of the second pair and adapted to mesh with the other gear of the first pair, means for reciprocating the second pair of gears and the additional gear simultaneously, means for rotating the additional gear and a hand-screw for securing the additional gear in a fixed position.

6. In a power-transmitting device the combination of a pair of gears secured together, a second pair of gears slidingly mounted with respect to the first pair, one of the second pair adapted to mesh with one of the first pair, an additional gear meshing with the second gear of the second pair and adapted to mesh with the other gear of the first pair, means for reciprocating the second pair of gears and the additional gear simultaneously, said means comprising a driving-lever, a collar connected with the second pair of gears, a collar connected with the additional gear, and a plate having arms embracing said collar.

7. In a power-transmitting device the combination of a pair of gears secured together, a second pair of gears slidingly mounted with respect to the first pair, one of the second pair adapted to mesh with one of the first pair, an additional gear meshing with the second gear of the second pair and adapted to mesh with the other gear of the first pair, means for reciprocating the second pair of gears and the additional gear simultaneously, a rod adapted to be rotated by the first pair of gears, a rod adapted to be rotated by the second pair of gears, each of said rods having right and left hand screw-threads, a nut connected with each of the said screw-threads, a frame connected with each nut, and means connected with each frame for varying the rate of speed at which power is transmitted through the device.

8. In a power-transmitting device the combination of a pair of shafts, an expansible pulley mounted on each shaft, four movable frames, one mounted near each end of each of said pulleys, each frame being provided with a nut, a pair of rods each having right and left hand screw-threads for said nuts, means for simultaneously rotating said rods in opposite directions, said means comprising a gear upon each rod and a gear for operating said gears, and means connected with said frames for expanding and contracting said pulleys.

9. In a power-transmitting device the combination of a pair of shafts, a pulley connected with each shaft, movable frames having means for expanding and contracting said pulley, each frame having a nut, a pair of rods having screw-threads for operating said nuts and frames, and means for transmitting motion from one rod to the other, said means comprising a pair of gears fixed to one rod, a pair of gears slidingly mounted on the other rod, one of the second pair meshing with one of the first pair, and an additional gear sliding with the sliding gears and meshing with one of them, said additional gear being adapted to mesh with the second gear of the first pair in one position in which it may be placed.

10. In a power-transmitting device the combination of a pair of disks having slots extending in different directions, a pulley made up of movable pieces, each having a projection extending through a slot of each disk, and means for adjusting one disk with respect to the other comprising a reciprocable worm and pins engaging the worm and connected with one of said disks.

11. In a power-transmitting device the combination of two pairs of slotted disks located opposite each other, a pulley supported between said disks and made up of a series of movable pieces each having a projection on each end extending through the slots of two of said disks, means for simultaneously adjusting one disk of each pair in the same direction, said means comprising a reciprocable worm and a stud connected with the adjustable disk and engaging the worm.

12. In a power-transmitting device the combination of two pairs of slotted disks located opposite each other, a pulley supported between said disks and made up of a series of movable pieces each having a projection on each end extending through the slots of two of said disks, means for simultaneously adjusting one disk of each pair in the same direction, said means comprising a reciprocal worm and a stud connected with the adjustable disk and engaging the worm, and a pivoted frame engaging the worm for reciprocating it.

13. In a power-transmitting device the combination of a shaft, two pairs of slotted disks mounted opposite each other thereon, a pulley mounted between said disks, said pulley comprising a series of movable pieces each having a projection upon each end extending into the slots of two of said disks, and means for adjusting one disk of each pair with respect to the other, said means comprising two worms slidingly mounted on the shaft, a stud connected with each of the adjustable disks and engaging the worm, a pair of pivoted frames engaging the worm for reciprocating them, each frame having a nut and a rod having right and left hand screw-threads for engaging said nuts and simultaneously moving said frames toward or from each other.

14. In a power-transmitting device the combination of a flat circular plate having a hub, a slotted disk mounted thereon, a second slotted disk movably mounted on the hub, means on the hub for forcing the second disk toward the plate, a hub secured to the second disk and having a stud projecting inwardly and a worm slidably mounted on said first-mentioned hub, the grooves of said worm engaging said studs.

In testimony whereof I have signed my name to this specification in the presence of two subscribing witnesses.

WILLIAM H. SAUNDERS.

Witnesses:
W. FRED. WORTHINGTON,
JAMES SAUNDERS.